March 24, 1970 G. MOUNTJOY 3,502,024
TIME FUZE
Filed May 18, 1967

INVENTOR
GARRARD MOUNTJOY

BY *Hurvitz, Rose & Greene*

ATTORNEYS

United States Patent Office 3,502,024
Patented Mar. 24, 1970

3,502,024
TIME FUZE
Garrard Mountjoy, Little Rock, Ark., assignor to Baldwin Electronics, Inc., Little Rock, Ark., a corporation of Arkansas
Filed May 18, 1967, Ser. No. 642,644
Int. Cl. F42b 9/08
U.S. Cl. 102—70.2                                    16 Claims

ABSTRACT OF THE DISCLOSURE

First and second capacitors are charged with respect to a common point of reference potential (ground). The first capacitor is small and it is connected to control firing potential of a first transistor switch. The second capacitor is large and it is connected in series with the first capacitor and with a timing resistance. A second transistor switch, normally open, is connected across the second capacitor only, and is closed in response to firing of the first transistor. A detonator is connected in the circuit of the second transistor switch, for firing by the discharge from the second capacitor.

Firing time of the detonator is a function of the initial capacitor voltages, and of values of capacities and timing resistance, and can be varied over a wide range by varying the initial voltage on the small capacitor, or the initial voltages on both capacitors. At the same time the capacitance of the large capacitor can vary by about 10% without substantially varying firing time, and the circuit operates by measuring time in terms of decay of voltage across a small capacitor through a zero value while that capacitor voltage is decaying at a rapid rate, to obtain great precision of time measurement.

It then becomes feasible to measure the values of the R and C of the timing resistance and of the small capacitor, or the time constant of the entire RCC circuit, and to impart to the capacitors voltages which reflect departure of these values or of the time constant, from standard, thereby providing near perfect time control without requiring precision components in the fuze itself.

BACKGROUND OF THE INVENTION

It is usual in time fuzes to provide an RC timing circuit. These are normally energized from a battery, which requires considerable space and involves considerations of shelf life. Further, for accurate timing the RC components must be precise, and must maintain values unchanged for considerable time periods and be relatively temperature insensitive. These requirements present serious problems.

It is old to provide battery-less RC fuze timers, as evidenced by the U.S. patents to Ruehlemann et al., 3,001,-477, 2,926,610, and 2,910,001; Gibson, 2,873,679; Kapp et al., 3,225,695; Kaspaul, 3,043,222.

In all prior art RC fuze timers, known to me, no provision is made for otbaining accurate timing, without requiring precise RC components. Nor do these prior art fuzes fire when voltage across a timing capacitor is passing through zero, in a region of high slope of the discharge curve.

SUMMARY OF THE INVENTION

The present invention provides a battery-less fuze, firing energy being supplied to a large capacitor just prior to firing of a missile containing the fuze. That energy is then discharged through the detonator of the missile after a preset time interval. A timing circuit is provided, according to the invention, which is relatively insensitive to the capacitance of the large capacitor, and in which variations from standard of values of capacitors and resistance of a timing circuit can be compensated in terms of voltages applied, after measurements of the constants of the timing circuits are made. These can be made just prior to firing and therefore need require no considerations of component value deterioration with age or temperature.

The capacitors are charged in opposite senses with respect to a point of reference potential, so that the large capacitor discharges into the smaller capacitor and effects a reversal of the algebraic sign of its charge, at a time when rate of change of its charge is high. Fuze firing occurs as the small capacitor voltage passes through zero, and thereby a precise firing time is established. This is in contradistinction to RC timing systems in which decay to zero of charge of a single capacitor is employed, since in such systems the voltage of the capacitor is near zero for a long time period, and inaccurate timing results.

DESCRIPTION OF THE PREFERRED EMBODIMENT

A relatively large capacitor $C_2$ is connected between ground G and a negative source of voltage $-E_2$, via a switch $S_2$, so that while the switch $S_2$ is closed $C_2$ is at potential $-E_2$ with respect to ground. A series circuit exists from ground G through positive voltage source $+E_1$, switch $S_1$, small capacitor $C_1$, and detonator D back to ground G. Detonator D is normally shunted by switch $S_3$. While $S_1$ is closed capacitor $C_1$ is at voltage $+E_1$, with respect to ground. $+E_1$ and $-E_2$ are made variable, for reasons which will appear hereinafter. Switches $S_1$ and $S_2$ are closed before a firing, to charge capacitors $C_1$ and $C_2$ to voltages required to establish a desired time delay between opening of switches $S_1$, $S_2$ and firing of detonator D. A timing resistor $R_1$ is connected across capacitors $C_1$ and $C_2$, taken in series, and an opening of switches $S_1$, $S_2$ a logarithmically decaying current flows through $R_1$.

The gate electrode G of an FET $Q_1$ is connected to the junction J of capacitor $C_1$ and resistance $R_1$. The FET $Q_1$ is maintained nonconductive by the positive voltage present on its gate electrode, while switches $S_1$ and $S_2$ are closed, but becomes conductive when the voltage across $C_1$ becomes sufficiently near to zero. The source electrode of FET $Q_1$ is directly connected to ground, and the drain electrode D via a resistance $R_2$ to the ungrounded or negative terminal of $C_2$.

The base of a transistor $Q_2$ is connected via a resistance $R_3$ to the drain electrode of FET $Q_1$. The emitter of $Q_2$ is connected to the ungrounded terminal of $C_2$ and the collector of $Q_2$ is connected to the detonator D.

On opening switches $S_1$ and $S_2$, a series discharge circuit exists, involving $C_1$, $C_2$ and $R_1$. The voltage across $C_1$ decays logarithmically until gate G of FET $Q_1$ attains firing potential. At this point $Q_1$ becomes conductive, placing the base of $Q_2$ nearer ground potential. $Q_2$ then becomes conductive, permitting $C_2$ to discharge through detonator D via $Q_2$. Also, conductivity of $Q_2$ may become greater by the action of the feedback path between gate of $Q_1$ through capacitor $C_1$ to the top of D. This is accomplished when the first rise in voltage across D (due to the current of $Q_2$ flowing through D) is transferred to the gate of $Q_1$ in the feedback mode. This produces high gain (through regeneration) of the now active transistor circuits. In this manner the base of $Q_2$ may be brought more quickly to ground potential by current in $Q_1$. In practice the first drawing of a small current in $Q_2$ produces sufficient regenerative effect to maximum the rise across D. It may be noted that the timing circuit includes detonator D, but the resistance of the latter is negligible in comparison with the resistance of $R_1$, so that timing is not affected by the presence of D.

Figure 1:
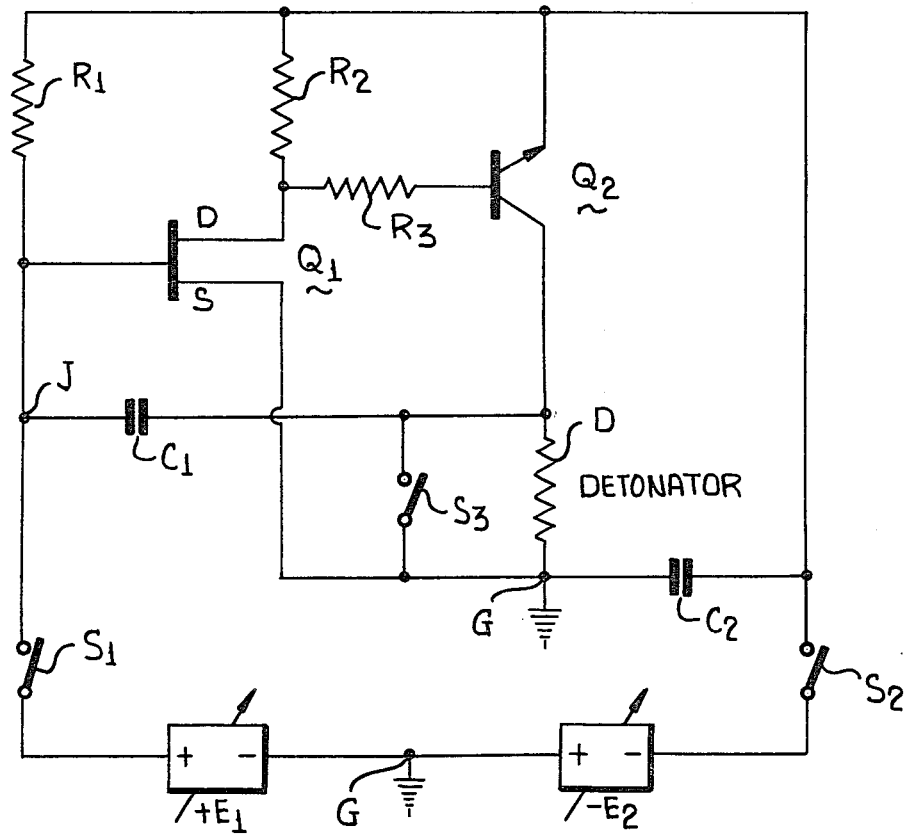
FIGURE 1 of the drawings is a schematic circuit diagram of a system according to the invention.
Figure 2:
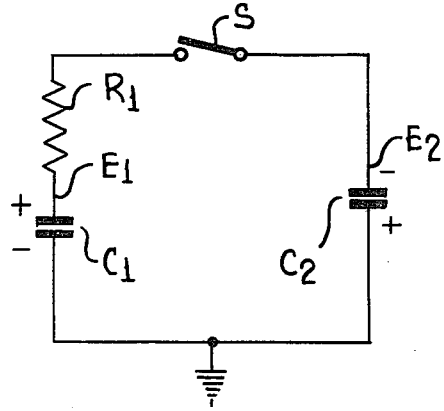
FIGURE 2 is a schematic circuit diagram of a timing circuit employed in the system of FIGURE 1.

FIGURE 2 shows a simplified equivalent of the timing arrangement of the system of FIGURE 1.

Let $e_1$ equal the instantaneous voltage of $C_1$ and $e_2$ equal the instantaneous voltage of $C_2$.

After closure of switch $S_1$ current is (1) $$i(t) = \frac{E_1 + E_2}{R_1} e^{\frac{-t}{RC_T}}$$

where $$C_T = \frac{C_1 C_2}{C_1 + C_2}$$

The voltage across $C_1$ is (2) $$V_{C_1} = \frac{1}{C_1} \int i(t) dt$$

substituting the expression of current $i(t)$ in Equation 1 into Equation 2

(3) $$e_1 = \frac{(E_1 + E_2)}{C_1 + C_2} C_2 \left[ e^{\frac{-t}{RC_T}} - 1 \right] + E_1$$

The firing point occurs when $e_1 = 0$.
Calculation then shows that for $$E_1 = 25.V E_2 = 25.V$$

firing point is reached at the end of 14.20 seconds, if $C_1 = .5 \mu f$
$C_2 = 5. \mu f$
$R_1 = 39 M$.

However, if $E_1$ is reduced to 5 v., everything else being the same, $e_1$ attains zero volts in 3.58 seconds.

It can be shown that a 10% variation in $C_2$ will have negligible effect on firing times, since the voltage across $C_1$ involves $C_2/C_1+C_2$ and $C_2$ is large relative to $C_1$. However, values of $R_1C_1$ have considerable effect on firing times.

If the time constant $R_1C_1$ or the time constant $R_1C_T$, is measured, before switches $S_1$, $S_2$, are opened, or before the capacitors are charged, and the correct or desired values for perfect timing are known, and if the measured values depart from the correct values, the value of $E_1$ or of both $E_1$ and $E_2$ may be adjusted to compensate for divergence between correct and measured values. Methods of accomplishing the necessary calculations do not form part of the invention, but the circuitry of the invention is so arranged that it is feasible to accomplish the correction following appropriate calculations.

The voltage across $C_1$ is initially positive. In the course of discharge of $C_1$ and $C_2$ that voltage proceeds from a positive value to a negative value, because $C_2$ transfers a negative charge to $C_1$. Therefore, the voltage across $C_1$ passes through zero, and by selection of voltages and circuit values, does so on a sharp portion of the slope of voltage variation with time. Thereby firing occurs at a precise moment of time. At this time $C_2$ has lost little of its charge, and therefore $C_2$ has adequate remaining stored energy to fire a detonator.

It is essential to the operation of the present system that $C_1$ and $C_2$ be independently charged to voltages appropriate to any desired timing. This does not require that ground point G be employed, but this is provided for convenience in explaining the circuit diagram.

It is the function of switch $S_3$ to maintain detonator D disabled until after occurrence of a predetermined event, such as firing of a shell, dropping of a bomb, etc., in accordance with conventional practice. The resistive value of D is small and is assumed not to affect timing operations.

I claim:

1. A time fuze, comprising
 a relatively small timing capacitor,
 a relatively large discharge capacitor,
 a timing resistance,
 means charging said capacitors to voltages of opposite polarities with respect to a reference point appropriate in values to a predetermined time elapse of discharge of said relatively small capacitor, having regard for the capacitances of said relatively small timing capacitor and said relatively large discharge capacitor and the resistance of said timing resistance,
 means initiating discharge of said relatively small timing capacitor, said relatively large timing capacitor and said timing resistance in a series circuit at an initial time,
 a load device, and
 means responsive to attainment of a predetermined value of voltage across said relatively small capacitor for effecting discharge of the charge of said relatively large capacitor through said load device.

2. The combination according to claim 1 wherein said predetermined value is substantially zero.

3. The combination according to claim 1 wherein said means responsive to attainment of a predetermined value of voltage includes a transistor having a control electrode connected to the junction of said timing resistance and said relatively small capacitor.

4. The combination according to claim 3 wherein said transistor is a field effect transistor.

5. The combination according to claim 1 wherein the last mentioned means includes a transistor switch for completing a series circuit including said detonator and said relatively large capacitor.

6. In a timing circuit,
 a normally open series circuit including in series a relatively large capacitor, a relatively small capacitor and a timing resistance,
 means charging said capacitors to voltages of opposite polarities with respect to the junction of said capacitors by means of current flows in opposite directions through said capacitors, respectively, and toward the junction of said capacitors,
 means completing said normally open series circuit, and
 means responsive to passage of the voltage of said relatively small capacitor through zero for firing a fuze.

7. The combination according to claim 6 wherein said control function is discharge of said large capacitor through a load.

8. The combination according to claim 7 wherein said load is a detonator.

9. The combination according to claim 8 wherein said voltages are selected to provide a predetermined timing of said firing for the time constant provided by said capacitors and said timing resistance, regardless of variations of that time constant from predetermined values, whereby accurate timing is achieved without utilizing precise values of said capacitors and said timing resistance.

10. In a timing circuit,
 a relatively small capacitor,
 a relatively large capacitor,
 a source of voltage of one polarity with respect to a reference point connected across said relatively small capacitor,
 a source of voltage of polarity opposite to said one polarity with respect to said reference point connected across said relatively large capacitor,
 a timing resistance connected across said capacitors taken in series with each other,
 means for at will disconnecting said sources from said capacitors,
 a further voltage reference point connected to the junction of said capacitors,
 the relative capacitances of said capacitors and the value of said timing resistance and said voltages being such that on relatively slight interchange of the charges of said relatively large capacitor and of said relatively small capacitor the voltage of said relatively small capacitor passes through the voltage of said further voltage reference point, a load, and means responsive to the passing of the voltage of said relatively small capacitor through said voltage of said further voltage reference point for discharging said relatively large capacitor through said load.

11. The combination according to claim 10, wherein is a normally open switch means connecting said relatively large capacitor in series with said load, and means closing said switch in response to the passing of the said voltage of said relatively small capacitor through said voltage of said further voltage reference point.

12. The combination according to claim 11 wherein said load is a detonator.

13. The combination according to claim 11 wherein said switch means is a semiconductor switch means.

14. The combination according to claim 13, wherein said semiconductor switch means includes a transistor connecting said load and said relatively large capacitor, and wherein said transistor includes a control element the voltage of which determines the conductivity of said transistor, and wherein is provided a regenerative circuit feeding back voltage existing across said load to said control element in such sense as to tend to increase the conductivity of said transistor.

15. The combination according to claim 14, wherein said regenerative circuit includes a field effect transistor having its drain electrode connected to said control element and a gate electrode to source electrode circuit including said load and said relatively small capacitor in series with each other.

16. The combination according to claim 10, wherein said further reference voltage point and said reference point are identical.

References Cited

UNITED STATES PATENTS 2,206,446    7/1940    Bereskin.
3,088,409    5/1963    Yarelberg _____ 102—70.2

FOREIGN PATENTS 922,193    3/1963    Great Britain.

VERLIN R. PENDEGRASS, Primary Examiner

U.S. Cl. X.R.

317—80